Jan. 3, 1950
C. R. HANNA
2,492,990
STABILIZING SYSTEM
Filed Nov. 6, 1943
5 Sheets-Sheet 1
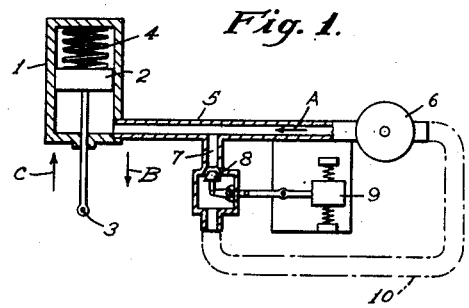
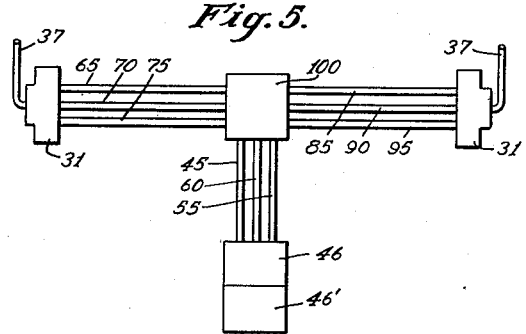
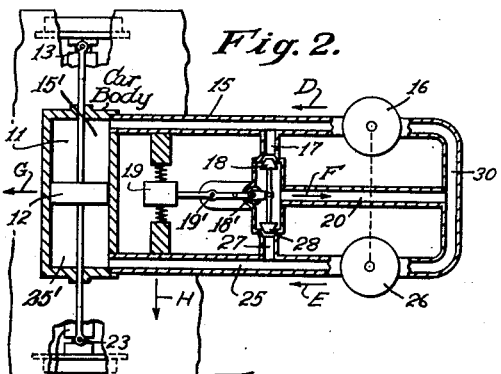
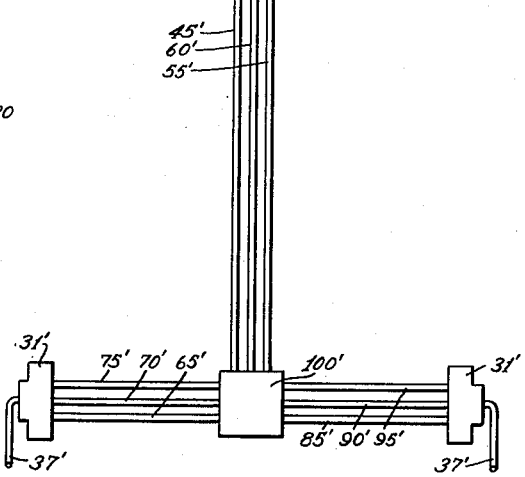
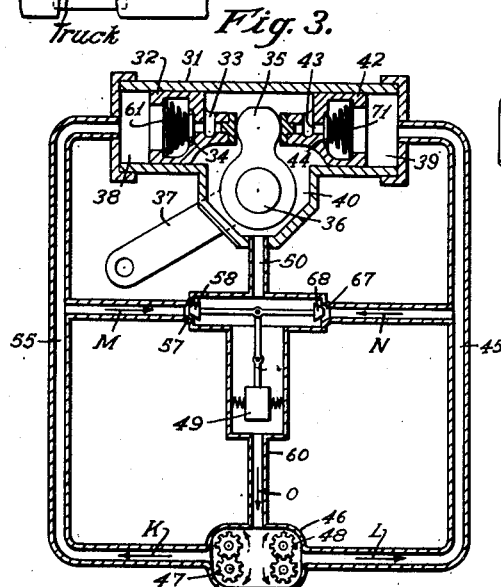
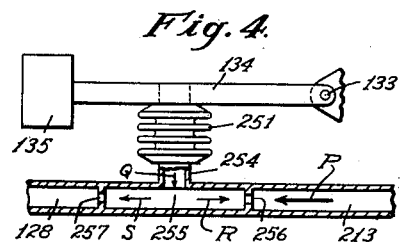
WITNESSES:
Edward Michaels
[signature]
INVENTOR
Clinton R. Hanna.
BY
Paul E. Friedemann
ATTORNEY Jan. 3, 1950     C. R. HANNA     2,492,990
STABILIZING SYSTEM
Filed Nov. 6, 1943     5 Sheets-Sheet 2
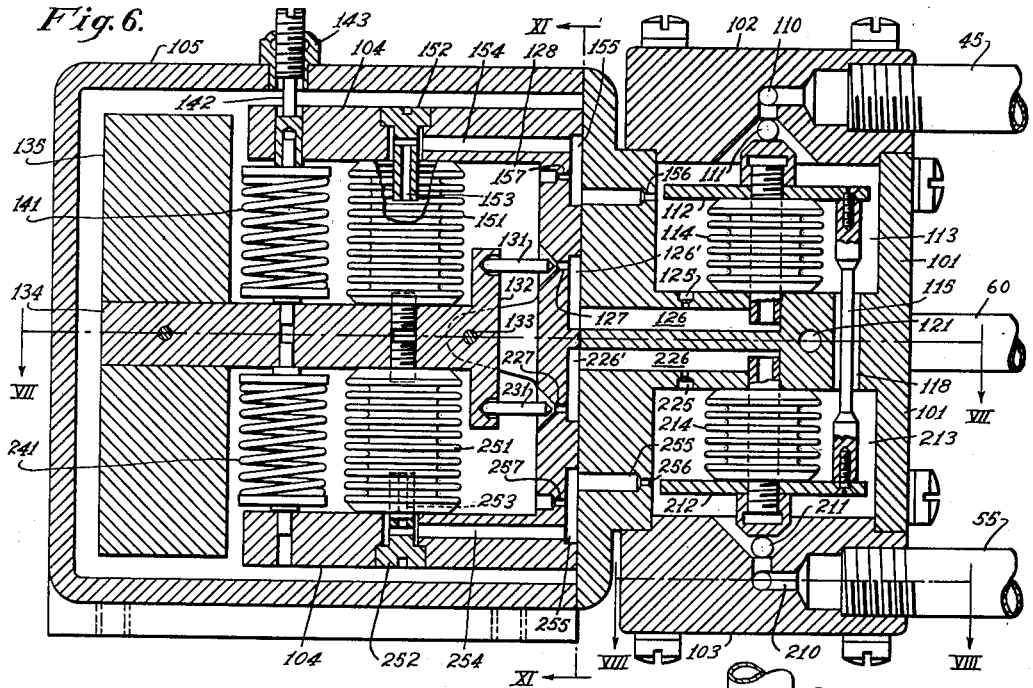
Fig. 6.
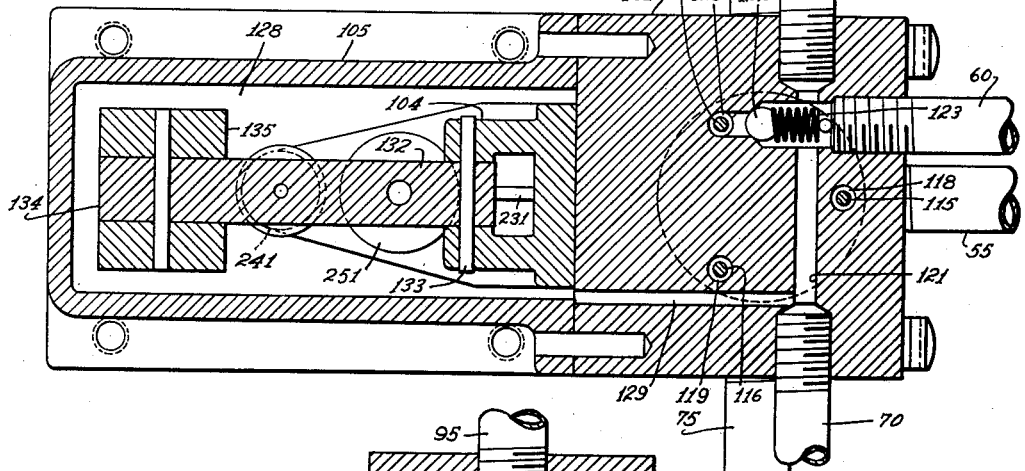
Fig. 7.
Fig. 8.
WITNESSES:
Edward Michaels
[signature]
INVENTOR
Clinton R. Hanna.
BY
Paul E. Friedeman
ATTORNEY

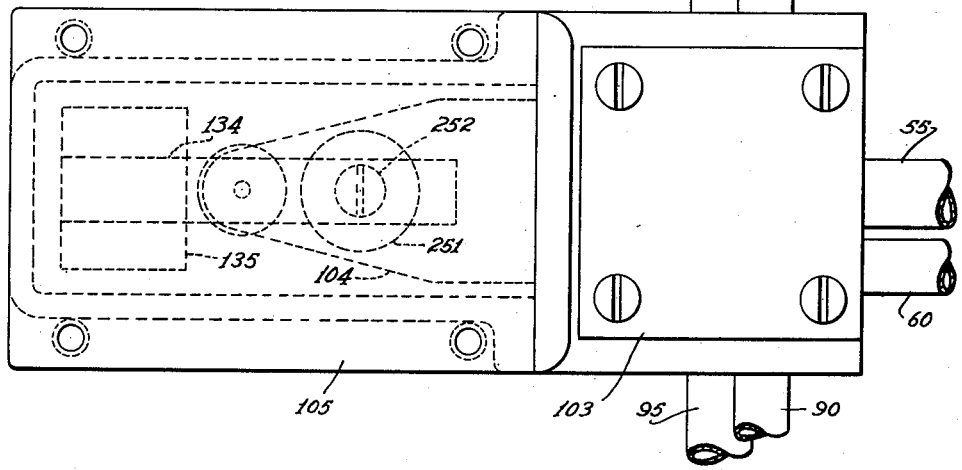
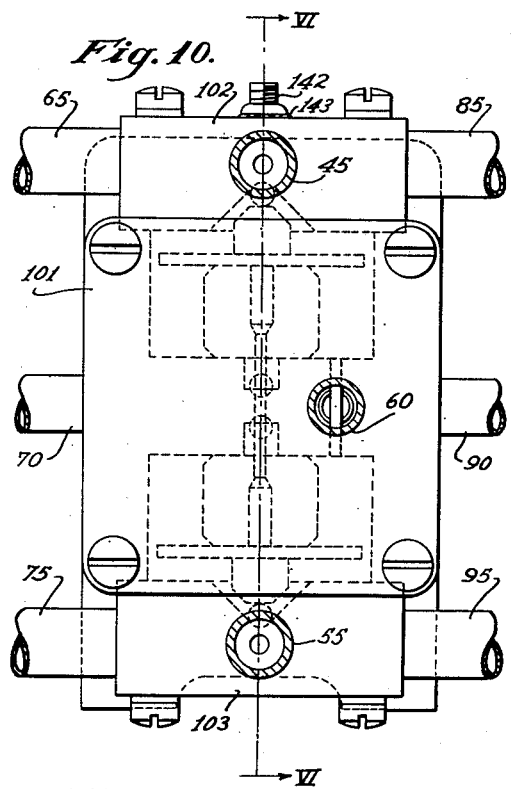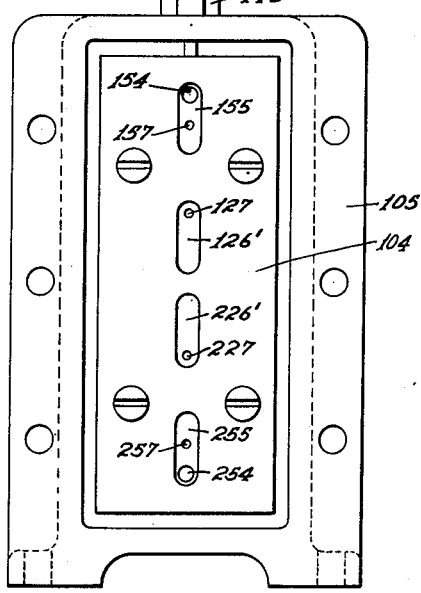

Jan. 3, 1950     C. R. HANNA     2,492,990
STABILIZING SYSTEM

Filed Nov. 6, 1943     5 Sheets-Sheet 4

WITNESSES:     INVENTOR
Edward Michaels     Clinton R. Hanna.
BY
Paul E. Friedemann
ATTORNEY Jan. 3, 1950　　　C. R. HANNA　　　2,492,990
STABILIZING SYSTEM
Filed Nov. 6, 1943　　　5 Sheets-Sheet 5
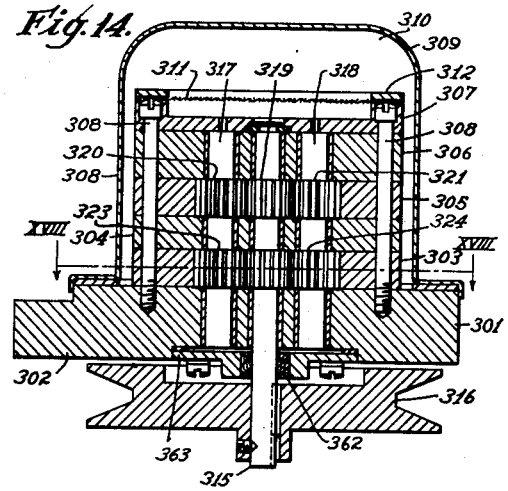
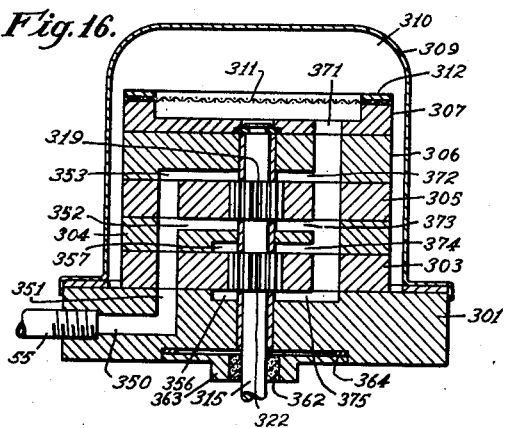
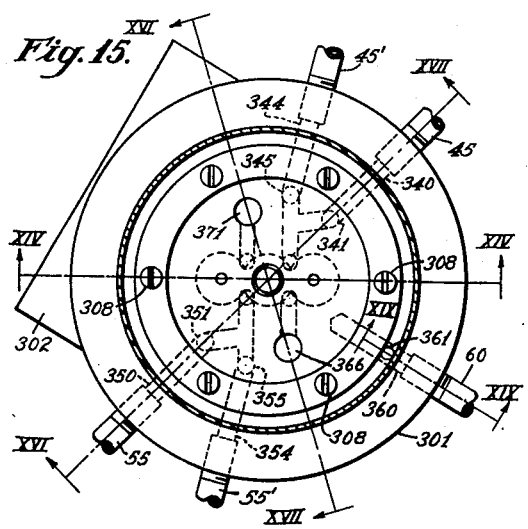
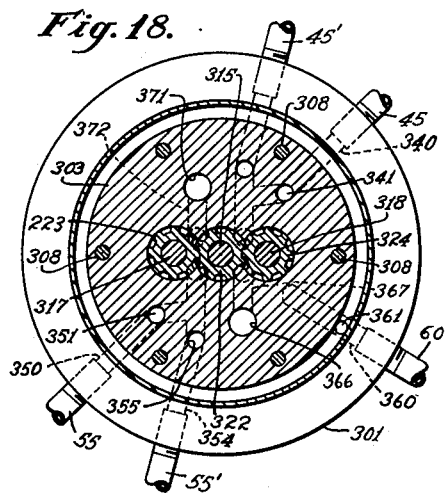
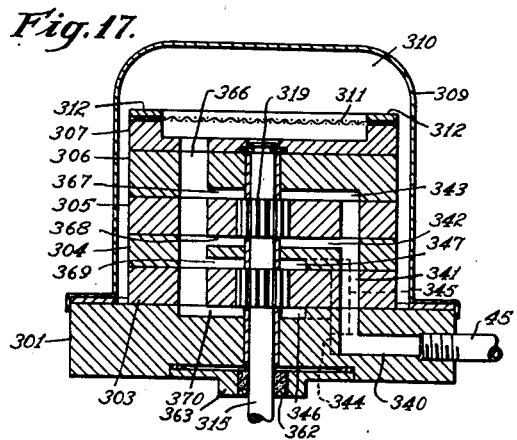
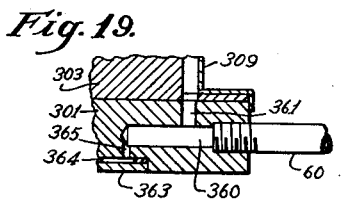
INVENTOR
Clinton R. Hanna.
BY
Paul E. Fiedemann
ATTORNEY

Patented Jan. 3, 1950

2,492,990

UNITED STATES PATENT OFFICE 2,492,990

STABILIZING SYSTEM

Clinton R. Hanna, Pittsburgh, Pa., assignor to Westinghouse Electric Corporation, East Pittsburgh, Pa., a corporation of Pennsylvania Application November 6, 1943, Serial No. 509,314

23 Claims. (Cl. 267—11)

My invention relates to stabilizing means for conveyances and in particular to stabilizers or shock absorbers for minimizing undesired movements of the sprung mass of a vehicle transverse to the path of travel.

Most of the known stabilizing devices of the shock-absorber type employed in road or rail vehicles operate on the dashpot principle. These devices do not respond to absolute unbalance motions of the sprung mass but react only to relative motion between sprung mass and unsprung mass with the effect of damping such motion, especially at resonance frequency, by developing friction. The improvement in riding comfort obtainable by such passive type absorbers is limited in several respects. In the first place, the better a passive absorber suppresses the resonance motion of the sprung mass, the more does it interfere with the shock-absorbing action of the elastic body suspension at non-resonant shock frequencies and thus reduce riding comfort at these other, especially higher frequencies. Hence, only a limited suppression of resonance motion is feasible. Furthermore, these absorbers are incapable of performing an absorbing function during those phases of unbalance motion in which little or no relative motion occurs between the sprung and unsprung masses and they also produce a damping effect in phases of relative motion where such damping is detrimental.

The first mentioned deficiency of shock absorbers has been reduced to a certain extent by the introduction of inertia-controlled hydraulic devices. In these devices, a governing mass resiliently mounted on the sprung mass serves to discriminate between its motion and that of the unsprung mass and actuates a valve for controlling the passage of fluid from one side of the shock-absorber piston to the other so as to increase the damping effect at resonance while reducing it at higher frequencies. Although this control diminishes the damping during those periods of operation where it is undesired, a residual detrimental action remains, and the known inertia controlled absorbers are still affected by the basic deficiency of the passive damping devices to limit their balancing action to only part of the cycle of unbalance motion.

It has been suggested to provide shock absorbers or the like vehicle stabilizing systems with hydraulic devices which are energized from a separate source of hydraulic pressure and valve-controlled by inertia-responsive governing means so as to exert an active shock-compensating effect during most of the cycle of shock or unbalance motion. However, the means heretofore suggested in accordance with this principle of operation are unsatisfactory. One reason for their failure, as I recognize it now by comparison with my invention, is the fact that the time delays inherent in the hydraulic operation are of the same order of magnitude as the unbalance oscillation sought to be compensated so that the shock-absorbing counteraction is ineffective in the initial phase of an unbalance motion. In general, the inertia-controlled response in the known systems is too slow for producing a virtually instantaneous counteraction in the shock absorbers proper. Even if a velocity-proportional inertia control is combined with an acceleration-responsive control, as has also been suggested, a system designed in accordance with the known proposals remains inherently sluggish and hence falls far short of perfection.

It is an object of my invention to provide a stabilizer of the active type which affords a considerable improvement in stability or riding comfort as compared with any of the known vehicle stabilizers or shock absorbers.

More particularly, this invention aims at a hydraulic and separately energized stabilizing system whose speed of response to the occurrence of unbalance motion is increased over that heretofore obtainable so as to render the inherent time delays of lesser order of magnitude than the expected frequencies of shock or unbalance motion to be compensated, so that the stabilizing effect begins virtually instantaneously upon occurrence of a disturbance and starts being effective during the inital quarter cycle of the disturbance motion.

In a related aspect, the invention seeks to provide an inertia controlled stabilizer system for vehicles which is capable of an increased or even virtually complete suppression of resonance motion by the sprung mass of the vehicle while avoiding any detrimental damping effect at frequencies beyond resonance.

A further object of the invention is to provide an active hydraulic shock absorber supplied with liquid under pressure which is controlled in dependence upon unbalancing movements of the vehicle body and wherein provision is made for continued operation in a passive manner in the event of failure of the pressure supply means.

It is also an object of my invention to reduce to a minimum the number of governing devices required for a complete hydraulic shock absorber of the active type.

These objects should be taken as illustrative as the invention aims also at other objectives which will become apparent from the description of embodiments in a later portion of this specification.

According to my invention, a stabilizing or shock-absorbing hydraulic system is provided with a shock absorber or the like cylinder and piston device and has a separate source of hydraulic pressure connected to the shock absorber by a conduit which has an escape opening controlled by an inertia-controlled valve so as to maintain normally an average opening or escape area. A constant flow of operating fluid is passed from the pressure source through the conduit and escape opening and produces a pressure in the shock absorber which varies in accordance with the inertia-controlled variations of the escape opening.

In a more specific aspect of the invention, the hydraulic connection between the pressure source and the shock absorber proper forms a closed circulation system through which a constant flow of fluid is maintained. This circulation system contains the above-mentioned escape opening and control valve in such a manner that the operation of the valve changes the impedance of the system to the flow of fluid therethrough.

In a further aspect of my invention, the above-mentioned main valves of the hydraulic system are actuated by means of auxiliary hydraulic devices which derive their operating pressure from the main system and are controlled by pilot valves. These pilot valves together with the main valves form a multiplying valve arrangement so that small forces and displacements effective at the pilot valves produce relatively large forces and displacements of the main valves.

More specifically and with reference to the last mentioned aspect of my invention, the main hydraulic system is provided with an intermediate pressure chamber which is located between the main valve and the input side or sump of the pumps and kept at a pressure intermediate the high output pressure of the pump and the low or neutral pressure of the pump inlet. This intermediate pressure chamber is effective as the source of hydraulic pressure for an auxiliary hydraulic system serving to actuate the main valves under control by the pilot valves.

Another feature of the invention consists in damping means which are associated with the inertia controlled governing device for providing a control effect in approximate proportion to the speed of the governing mass in its unbalance direction relative to its support and independent of the viscosity of the hydraulic operating fluid.

The foregoing features as well as additional characteristics of my invention will be understood from the following description of the embodiments illustrated in the drawings in which:

Figure 1 is an explanatory diagram showing schematically a hydraulic circuit which involves a principle of valve operation applied in stabilizing systems according to the invention;

Fig. 2 shows diagrammatically another hydraulic circuit system of more elaborate form also based on the same principle of operation;

Fig. 3 represents a still further developed hydraulic system and may be taken as the scheme which underlies the main hydraulic conduit system employed in the embodiment shown in Figs. 5 through 12;

Fig. 4 is an explanatory diagram serving to elucidate the operation of hydraulic damper bellows used in the embodiment of Figs. 5 through 12;

Figure 12:
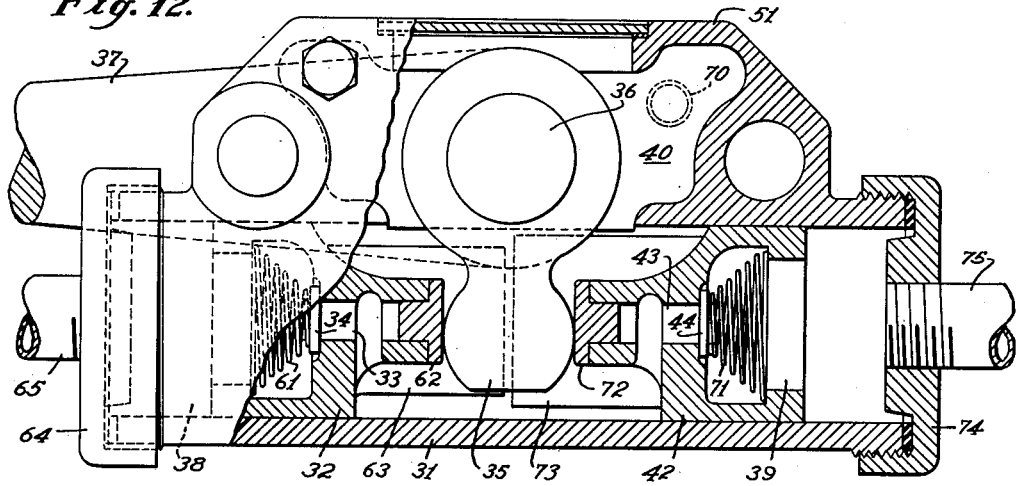
Figure 13:
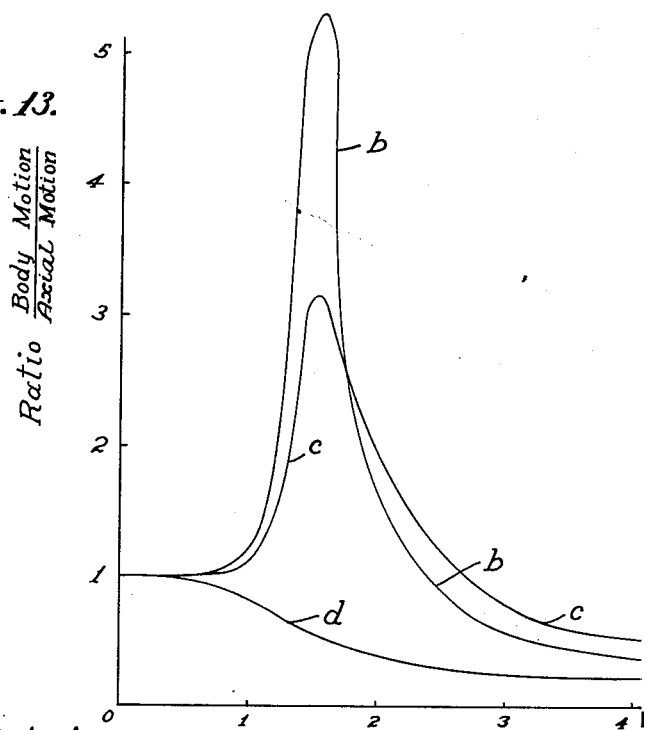

Figs. 5 through 12 in totality illustrate a complete stabilizing system in detail;

More specifically, Fig. 5 represents schematically the hydraulic conduit connections for a two-axle vehicle such as an automobile with two front and two rear shock absorbers operated by two pump aggregates and controlled by two control devices, respectively;

Fig. 6 is a sectional view of one of the two control devices, the section being taken along the plane of symmetry denoted in Fig. 10 by the dot-and-dash line marked VI—VI;

Fig. 7 is a cross-section through the same control device, the plane of section being indicated in Fig. 6 by the dot-and-dash line marked VII—VII;

Fig. 8 is a cross-section through another portion of the same device taken along the vertical plane denoted in Fig. 6 by the dot-and-dash line marked VIII—VIII;

Fig. 9 is a bottom view of the control device shown in Fig. 6;

Fig. 10 is a front elevation seen from the right-hand side of Fig. 6;

Fig. 11 is a front view of a separable portion of the same device, the plane of view being indicated in Fig. 6 by the dot-and-dash line marked XI—XI;

Fig. 12 shows, mainly in section, one of the four shock absorbers of the stabilizing system and may also be taken as a more detailed illustration of the shock absorber represented schematically in Fig. 3;

Fig. 13 is an explanatory diagram referring to the embodiment of Figs. 5 through 12 and showing a coordinate system of comparable curves elucidating the riding qualities of a vehicle equipped with a balancing system according to the invention;

Figs. 14 through 19 illustrate a pump for a hydraulic system according to Figs. 5 through 12 and in accordance with the schematic representation of Fig. 5;

More specifically, Fig. 14 is an axial section through the complete pump, the section being taken along the line denoted in Fig. 15 by the dot-and-dash line marked XIV—XIV;

Fig. 15 is a top view, partly in section, of the same unit;

Fig. 16 is an axial cross-section of the pump taken along the lines denoted in Fig. 15 by the dot-and-dash line marked XVI—XVI, the drive wheel of the pump being omitted in Fig. 16;

Fig. 17 is another section in the axial direction taken along the planes denoted in Fig. 15 by the dot-and-dash line marked XVII—XVII, the drive wheel and the outer pump casing being omitted;

Fig. 18 represents a radial cross-section along the plane designated in Fig. 14 by a dot-and-dash line marked XVIII—XVIII; and Fig. 19 is a partial section through the same pump taken along a radially and axially extending plane indicated in Fig. 15 by the dot-and-dash line XIX—XIX.

The explanatory diagram of Fig. 1 shows a cylinder 1 which contains a piston 2 provided with an attachment 3 and biased by a spring 4 for downward motion within the cylinder. The compression chamber thus formed underneath the piston is connected with a conduit 5 to which a liquid such as oil is supplied by a pressure source 6 consisting, for instance, of a pump. The conduit 5 has an escape opening at 7, the cross-section of which is controlled by a valve 8. The valve is actuated by an inertia controlled device 9 here represented by a mass and two springs which maintain the mass suspended relative to two abutments rigidly related to the conduit and cylinder. The valve 8 is normally in an intermediate position in which a predetermined average cross-section of the escape opening is maintained. During the operation of the hydraulic system, a constant flow of fluid in the direction of the arrow A is maintained by the pump 6. This flow produces normally an average pressure in the piston chamber depending upon the valve controlled cross-section of the escape opening 7. The pressure in the cylinder maintains the piston 2 in an intermediate raised position in opposition to the gravity of the piston and the elements attached thereto and in counteraction to the force of spring 4.

Let us now assume that the conduit and cylinder system as a whole is attached to the unsprung mass of a vehicle while the attachment 3 is linked to the sprung mass. When the unsprung mass with the conduit system is suddenly moved in the downward direction as indicated by the arrow B, the mass 9 will tend to maintain its original position in space, that it, the mass 9 will move relative to the unsprung mass in the upward direction. The control element of valve 8 is so linked to the mass 9 that it will also move upwardly with respect to the unsprung mass. Consequently, the cross-section of escape opening 7 controlled by the valve is diminished. As a result, the rate of fluid flow through escape opening 7 is reduced and the pressure in the cylinder chamber increased. Due to this increase in pressure, the piston 2 is moved in the upward direction, as indicated by the arrow C. If the rate of fluid flow, valve control, and change of cylinder pressure are dimensioned properly, the upward motion imparted by the piston 2 to the attachment 3 relative to the downward moving cylinder 1 may have such a magnitude that it is approximately equal to the downward motion. In such a case, the attachment 3 and the vehicle sprung mass connected thereto have the tendency to maintain their original position in space regardless of the downward motion of the unsprung mass including the conduit 5 system.

When the escape opening 7 is connected by a return conduit 10 (shown in broken lines) with the pressure source, for instance, the intake opening or sump of the pump 6, a closed hydraulic circulation system exists from the pump through conduit 5, the valve controlled escape opening 7, and the return conduit 10. The operation of the pump 6 in such a case has the effect of maintaining a continuous flow of operating fluid through the closed hydraulic circuit, and the pressure in the stabilizing cylinder 1 may then be considered as being controlled in dependence upon the variable impedance to fluid flow in that circuit controlled by the valve 8.

As will be pointed out in the following, the stabilizing system according to the invention makes use of the above-explained principle of controlling a stabilizing or shock-absorbing device proper by connecting the device hydraulically with a conduit system in which a circulation of fluid is maintained and controlled.

On the basis of the foregoing explanation, the double-acting system according to Fig. 2 will be readily understood. According to this schematic diagram, a cylinder 11 contains a piston 12, provided with two attachments 13 and 23, which forms two oppositely acting pressure chambers on both sides of the piston so that the latter moves in accordance with the difference in the pressures effective in the two chambers. One of the chambers is connected by a pressure conduit 15 with the output side of a pump 16. The other pressure chamber is connected by a conduit 25 with the outlet of a second pump 26. The two pumps are mechanically coupled with each other as is denoted by a dotted line connection and have a common sump 30. The pressure conduit 15 has an escape opening at 17 which is controlled by a valve 18. Similarly, the conduit 25 has an escape opening 27 controlled by a valve 28. The escape openings are in communication with each other so that a bypass connection is formed between the conduits 15 and 25. This bypass connection is in communication with the sump 30 by means of a connecting neutral conduit 20.

The two valves 18 and 28 are mechanically connected with each other so that when one reduces the appertaining escape opening, the other increases its opening. The interconnected valves are controlled by an inertia responsive control device formed by a resiliently suspended mass 19 and operative in the manner described previously in connection with the inertia controlled device 9 of Fig. 1. The mass 19 is linked to the valves by means of two levers pivoted at 18' and 19', respectively, so that a deflection of mass 19 relative to the conduit system causes a corresponding relative displacement of the movable valve member in the same direction.

When the two pumps 16 and 26 are in operation, a continuous flow of fluid from pump 16 issues into conduit 15 in the direction of the arrow D. As a result, pressure is built up in the space 15' of cylinder 11 depending upon the cross-section of escape opening 17 normally kept open by the valve 18. Simultaneously the fluid issuing from pump 26 into conduit 25 in the direction of the arrow E builds up a counterpressure in the other space 25' of cylinder 11. Since normally the opening controlled by valve 28 is equal to that of valve 18, the pressures in both spaces are equal so that the piston 12 and the parts attached thereto remain stationary. The fluid which constantly passes from conduits 15 and 25 through the openings 17 and 28, respectively, is returned through conduit 20 in the direction of arrow F and flows back to the inlet side or sump 30 of the two pumps.

According to the illustrated embodiment (Fig. 2), the system just described is placed horizontally and mounted on the body (sprung mass) of a railroad car, the body being supported by springs so as to be movable within limits relative to the truck (unsprung mass) of the car. The mass 19 is pivoted on the car body for horizontal deflection, and the attachments 13 and 23 are linked to the truck. When the railroad car moves in the travelling direction indicated by the arrow G, a lateral shock transmitted by the wheels to the truck in the direction of the arrow H will have the effect of initiating a movement of the body, and thus the conduit system, in the same direction with the result of producing a relative but oppositely directed horizontal motion between the conduit system and the inertia controlled mass 19. The relative deflection has the effect of reducing the flow area of opening 17 and increasing the cross-section of opening 27. Hence, the pressure in the piston chamber 15' will increase and the pressure in the chamber 25' will decrease so that the piston 12 is moved in the direction indicated by the arrow H. It will be seen that the relative motion of the piston 12 and its appertaining parts can be used to balance the deflection of the body so that the body tends to maintain substantially its original position in space. If the lateral shock motion imparted to the railroad car occurs in the opposite direction, the double-acting cylinder and piston device will again move relatively in the balancing direction and hence tend to compensate the undesired deflection.

It will be understood from the foregoing that a system of this type is capable of absorbing or compensating undesired motion or vibration in any direction depending on the selected plane of motion of the inertia responsive control device. By combining a plurality of balancing systems according to the invention, a compensation for displacements in more than one plane can be obtained. For instance, in the last-mentioned example of a railroad car, the above-described system for balancing horizontal motions transverse to the travelling direction of the car may be combined with a cylinder system whose interia controlled device responds to vertical motion of the car transverse to the travelling direction. Such a combined system has the tendency of maintaining the car body stabilized for motion in the travelling direction and hence provides maximum riding comfort.

The hydraulic circuit diagram according to Fig. 3 is a further development of that shown in Fig. 2 and represents the basic scheme of the embodiment illustrated in detail in Figs. 5 through 12. According to Fig. 3, a double-acting shock absorber is provided whose cylinder 31 contains two pistons 32 and 42, forming, together with the cylinder 31, two pressure chambers 38 and 39 at the cylinder ends, and a neutral space, or chamber 40, intermediate the pistons. A ball shaped coupling element 35 is provided in the neutral chamber and attached by a hub to a shaft 36. The shaft extends through the walls of the cylinder and carries an arm 37 exteriorly of the cylinder. When in use, the arm 37 is linked to the wheel support or truck (unsprung mass), while the cylinder 31 is attached to the body (sprung mass) of a vehicle, in a manner customary with ordinary shock absorbers of automobiles. Hence, the relative motion between the cylinder 31 and the arm 37 is used for absorbing the motion to be compensated.

Piston 32 has a duct 33 which forms a communication between the pressure chamber 38 and the neutral space 40 and is controlled by a check valve 34. This valve prevents a fluid flow from the pressure chamber 38 to the neutral chamber 40 while being ineffective when flow occurs in the opposite direction. Similarly, the piston 42 has a duct 43 which connects the pressure chamber 39 with the neutral chamber 40 and is controlled by a unidirectional valve 44 similar to valve 34. The check valves function to prevent cavitation in either of the pressure chambers by permitting a flow from the neutral chamber 40 to either of the pressure chambers if the pressure in the latter declines below that existing in the neutral chamber.

Numeral 46 denotes a gear pump whose casing contains pairs of impeller gears or rotors 47 and 48 which perform the action of two separate pumps, operating simultaneously and in synchronism and having the same operating capacity. The output of one of these combined pumping means is connected by a pressure conduit 45 with the pressure chamber 38. The second outlet of pump 46 is connected by a conduit 55 with the pressure chamber 39. The two conduits 45 and 55 are interconnected by a bypass which forms escape openings at 57 and 67 and is in communication with the common inlet or sump of the pump 46 through a neutral conduit 60. The neutral chamber 40 of the shock absorber proper is also connected with the pump inlet by a neutral connection 50. Escape openings 57 and 67 are controlled by interconnected valves 58 and 68 which are normally in an intermediate position so as to maintain a given cross-section of the appertaining escape opening.

In operation, the pump 46 is constantly driven so as to issue two separate streams of fluid in the direction of the arrows K and L. The fluid circulates through the escape openings 57 and 67 and returns to the pump through the neutral conduit 60 in the direction of the arrows M, N and O. As in the previous examples, the pressures built up in the two chambers 38 and 39 are normally balanced so that no moving force or movement is imposed on the arm 37. Upon occurrence of an unbalancing motion, however, the unbalance responsive control device 49, operating like those of the preceding embodiment, actuates the interconnected valves 58 and 68 so that one is caused to increase the cross-section of its escape opening while the other reduces its opening. Consequently, the pressure in one of the pressure chambers 38 and 39 is increased and the pressure in the other simultaneously decreased. Thus, the pistons 32 and 42 move in the same direction relative to cylinder 31 and cause the arm 37 to perform a relative motion tending to balance the disturbing motion to be compensated. Due to the fact that the neutral chamber 40 of the shock absorber proper is in connection with the neutral conduits of the hydraulic circulation system, the pressure acting on the gaskets and joints of the absorber is reduced, thereby increasing the efficiency of the device and reducing or avoiding the loss of operating fluid.

The foregoing explanation of the hydraulic system and method of control will facilitate understanding the design and operation of the complete vehicle stabilizing system now to be described with reference to Figs. 5 through 12.

Fig. 5 is a diagram of a shock absorber installation for a four-wheel vehicle such as an automobile. Two shock absorbers 31, each having a movable arm 37, are provided near the front wheels, respectively. These two absorbers are connected by conduits 65, 70, 75, and 85, 90, 95 with a common control device, which, in turn, is connected by three conduits 45, 60, and 55 with a double-acting gear pump. Each of these front shock-absorbers corresponds in principle to the shock absorber shown in Fig. 3, and the common gear pump 46 is, in principle, also in accordance with the gear pump 46 shown in the just-mentioned explanatory figure. For the sake of distinction, the pressure conduits appertaining to one of the two pressure chambers of the shock absorbers are designated in the following as "compression" conduits, while the conduits appertaining to the operation of the second pressure chamber are hereinafter called "rebound" conduits. Conduits 45, 65, and 85 in Fig. 5 are compression conduits, and conduits 55, 75 and 95 are rebound conduits. The intermediate conduits 60, 70 and 90 are neutral conduits corresponding as to function to the neutral conduits 50 and 60 in Fig. 3.

The rear wheels of the vehicle according to Fig.

5 are likewise provided with two shock absorbers 31' each having a movable arm 37'. These two rear shock absorbers are controlled by a common control device 100' with which they are connected by compression conduits 65' or 85', rebound conduits 75' and 95', and neutral conduits 70' or 90'. The control device 100' is, in turn, connected by a compression conduit 45', a rebound conduit 55', and a neutral conduit 60' with a second double-gear pump 46'. The two pumps 46 and 46' are of similar construction and mechanically interconnected to be driven by a common power source, for instance, a belt drive operated from the propulsion engine of the vehicle. The front control system and rear control system are separate in hydraulical respect and are merely interconnected by the common drive of the pumps. A favorable embodiment of such a double arrangement of gear pumps will be described in a later place with reference to Figs. 15 through 19. It should be understood, however, that the operation of the system is not dependent on any particular construction of the hydraulic power source as long as this source complies with the requirements set forth hereinafter.

The installation represented by Fig. 5 may be mounted on the sprung mass of the vehicle. That is, the pumps, pipe connections, and the cylinder portions of the shock absorbers proper may be secured to the sprung mass, while the ends of the shock-absorber arms 37 and 37' are attached to the unsprung mass of the vehicle. However, it is also possible and advantageous in certain cases of application to arrange the hydraulic system on the unsprung mass and to connect the arms of the shock absorbers with the chassis or sprung mass. In both cases the inertia controlled governing devices and valves should be mounted on the sprung mass, flexible hose connections being employed, if necessary, to connect the governors with the chassis-mounted parts of the hydraulic conduit system.

The use of a common hydraulic control system for a pair of shock absorbers arranged for the same axle of the vehicle is satisfactory for automobiles and in other cases where lateral roll of the vehicle is insignificant. If such lateral roll is to be expected, a separate hydraulic pump and valve system for each shock absorber may be provided.

The four shock absorbers shown in Fig. 5 are substantially of the same construction, being designed in accordance with the showing in Fig. 12. According to Fig. 12, the cylinder 31 is covered at both ends by closure members 64 and 74 and is provided with an extension 51 which houses part of the neutral chamber 40 and is traversed by the pivot bolt 36 of the arm 37. The hub of the coupling member 35 is firmly secured to the shaft 36. Each of the two pistons 32 and 42 has a duct 33 or 43 which forms a communication between the neutral chamber 40 and the compression chamber 38 or rebound chamber 39 formed between the pistons and the closures 64 and 74, respectively. The compression chamber 38 has a duct which communicates with the compression conduit 65. Similarly, the rebound chamber 39 is hydraulically connected to the rebound conduit 75. The duct 33 is controlled by a check valve 34 which is biased by a conical spring winding 61 so as to prevent a flow of fluid from the compression chamber 38 to the neutral chamber 40 while permitting a flow in the reverse direction. Similarly, a valve 44 biased by a spring 71 closes the duct 43 in piston 42 so as to check the flow of fluid from the rebound chamber 39 to the neutral chamber 40 while permitting a flow in the opposite direction. For reasons of manufacture, the ducts 33 and 43 consist of axial bore holes closed towards the coupling element 35 by stoppers 62 and 72 which abut against the member 35 when transmitting motion thereto. The neutral chamber 40 is in communication with the neutral conduit 70.

The pistons 32 and 42 have an extension 63 or 73 whose outer peripheral surface engages the inner cylinder surface in order to insure a proper guidance of the pistons.

It will be apparent that the double-acting shock absorber just described does not contain damping or friction means usually provided in the customary inactive type absorbers. The shock-absorbing or balancing operation of the illustrated device relies on the operation of a separate source of hydraulic power, namely, the pump 46 or 46' (Fig. 5). The motion of each piston relative to the cylinder is determined by the difference in the pressures effective in the pressure chambers 38 and 39, and these pressures are derived from the operation of the pump operated hydraulic circulation system and controlled by the device 100 or 100' in dependence upon the inertia effect of the motion to be compensated.

The control devices 100 and 100' (see Fig. 5) for performing this control effect are designed in accordance with the embodiment represented by Figs. 6 through 11.

Each control device contains a number of various valve controlled conduits and ducts which are formed by bores, cavities, and openings in five bodies denoted by 101, 102, 103, 104, and 105. These bodies are firmly and tightly connected with one another so as to form a rigid structure serving as a fluid container and as a support for a number of moveable elements described hereinafter.

The body 102 (Figs. 6 and 10) has a T-shaped bore whose three conduits are located at three different sides of the body and are connected with the three compression conduits 45, 65 and 85 in accordance with the schematic representation of Fig. 5. The body 103, as is best apparent from Fig. 8, is of similar design. That is, it has also a T-shaped combination of ducts denoted by 210 which open towards three different sides of the body 103. The openings are in connection with the three rebound conduits 55, 75, and 95.

The duct 110 in body 102 has a branch which opens into an intermediate pressure chamber 113 formed between bodies 101 and 102 (Fig. 6). The opening is controlled by a poppet valve whose valve member 111 is actuated by a disk 112. The duct 210 in body 103 opens into an intermediate pressure chamber 213 formed between bodies 101 and 103. The opening is controlled by a poppet valve whose valve ball 211 rests against a disk 212. The two disks 112 and 212 are rigidly connected with each other by three struts 115 (Fig. 6), 116, and 117 (Fig. 7) which extend through corresponding bores 118, 119, and 120, respectively, of body 101. The diameter of these bores is larger than that of the struts by a sufficient dimension so that the annular space between the struts and the wall of the bores forms a hydraulic communication between the intermediate pressure chambers 113 and 213. The bore 120 surrounding the strut 117 is in communication with a transverse duct 121 in body 101 (Fig. 7), which, in turn, communicates with the neutral conduit 60 leading to the pump and the neutral conduits 70 and 90 leading to the left and right shock absorbers, respectively. The communication between bore 120 and duct 121 is controlled by a relief valve 122 biased by a spring 123 which checks the flow of oil from the neutral conduits 60, 70, and 90 towards the intermediate pressure chambers 113 and 213 but permits a flow of oil from these intermediate pressure chambers into the neutral conduits. The setting of this valve determines the value of the intermediate pressure maintained in chambers 113 and 213.

As far as described, the control device in conjunction with the pump, conduits, and shock absorbers of the system represents a circulation system in accordance with the principle previously explained in connection with Fig. 3. This will be clear from the following consideration. The oil flow from the rebound chamber of each shock absorber, passing through the rebound conduits 75 and 95, merges with the oil flow from the pump which is supplied through the conduit 55 (Fig. 10). In the same way, the oil flow through the compression conduit 45 merges with the flow through the compression conduits 65 and 85 coming from the compression chambers of the shock absorbers (Fig. 10). The merging oil flow from the compression side of the system passes through the intermediate pressure chamber 113 and thence into the bore 120 from which it passes into the neutral duct 121 which is connected with the neutral pump conduit 60 as well as with the neutral conduits 70 and 90 leading to the shock absorbers (Fig. 7). The poppet valve 111 is normally open and thereby relieves the pressure transmitted from the compression pump conduit 45 to the compression chambers of the shock absorbers in principally the same way as explained previously in connection with Fig. 1. The oil passing through the control valve 111 escapes into the neutral duct. Consequently, a continuous circulation of oil is maintained between the pump and through the intermediate pressure chamber 113 back to the neutral conduit and the inlet side or sump of the pump. Likewise a similar circulation of oil is normally maintained from the pump through the rebound conduit 55 and the opening of control valve 211 to the intermediate pressure chamber 213 and thence back through the bores 120 and 121 to the neutral side of the conduit system. Since the two valves 111 and 211 are mechanically interconnected, the operation of these valves has the effect of reducing the cross section of the escape opening at 111 when increasing the corresponding cross section at the other valve 211 and vice versa. Consequently, during the actuation of these valves, the pressure in the compression chamber of each appertaining shock absorber is increased while the pressure in the rebound chamber is decreased and vice versa.

The just-mentioned push-pull operation of the main control valves is effected by an auxiliary hydraulic system which is so linked with the above-described main operating system as to derive its power therefrom. The hydraulic actuating means of valve 111 comprises an expansible bellows 114 which is arranged in the intermediate pressure chamber 113 and has a single axially located duct connected with a bore 126 of body 101 (Fig. 6). This bore communicates also with the intermediate pressure space 113 through a metering orifice 125. Bore 126 is in registry with a cavity 126' of body 104 (Figs. 6 and 11) which communicates with the inner space 128 of body 105 through a duct 127. This duct is controlled by a poppet valve 131 (Fig. 6) which serves as a pilot valve for controlling the operation of the actuating bellows 114 in a manner to be described presently.

The inner space 128 of body 105 is connected by a duct 129 with the neutral duct 121 in body 101 (Fig. 7), and hence with the neutral conduit 60 leading to the pump. Consequently, a continuous flow of fluid is branched off from the intermediate pressure space 113 (Fig. 6) through the orifice 125, the ducts 126, 126' and 127, the interior 128 of body 105, and through the duct 129 (Fig. 7) back to the neutral side of the hydraulic system. The pilot valve 131 is normally maintained in an intermediate position. Consequently, a constant stream of liquid passes through the conduit 126 and escapes through duct 127 to the low pressure side of the hydraulic system. If this branch system is compared with the diagrammatic showing of Fig. 1, it will be seen that the bellows 114 in hydraulical respect, is connected with the conduit 126' and the pilot valve 131 in basically the same way as the cylinder and piston device according to Fig. 1 with the appertaining valve controlled conduit system. Hence, it will be seen that any change in position of the pilot valve 131, varying the effective cross section of the escape opening at 127, will cause the bellows 114 to expand or contract depending upon the direction of the valve movement. This arrangement of the main control valve 111 and the pilot valve 131 has the effect that a relatively small force change applied to the pilot valve produces a large force change at the main valve, and that a relatively small flow of fluid through the pilot valve is sufficient to perform this amplifying control of the main valve. Thus this action is, in effect, a multiplying operation.

The hydraulic actuating member of the valve disk 212 consists of a bellows 214 which is arranged coaxially with the above-mentioned bellows 114 and in communication with a duct 226. A constant flow of fluid is supplied to this duct through an orifice 225 from the intermediate pressure chamber 213 and passes through a bore 226, a cavity 226', and an escape duct 227 controlled by a pilot valve 231 into the low-pressure interior 128 of the body 105 (Fig. 6), whence the fluid escapes to the neutral pump conduit 60 through the duct 129 (Fig. 7). The multiplying function of this valve system is similar to that of the above-described valve combination. However, the two pilot valves 131 and 231 are attached to a common control lever 132 which, at 133, is pivotally mounted on body 104 (Figs. 6 and 7) and connected with an arm 134 which carries a mass 135 for effecting an inertia responsive control. Due to this interconnection of the two pilot valves, a motion of the mass 135 relative to the stationary structure of the device will have an opposite effect on the two valves. That is, when pilot valve 131 increases the cross section of the escape duct 127 and hence causes the bellows 114 to contract, the pilot valve 231 will decrease the cross section of escape opening 227 and hence cause the bellows 214 to expand (push-pull action).

During the above-described performance, the structure including the disks 112, 212 and the connecting struts 115 act as an equalizer as regards the operation of the two main valves. The equalizing function is brought about as follows. The pressures supplied by the pipes 45 and 55 from the two pumps depend upon the extent to which the by-pass valves 111 and 211 open; and these valves will normally open to such an extent as to equalize the pressures, for, to be in equilibrium, the fluid pressure force tending to open each valve must be opposed by an equal force tending to close it. Hence, the equalizer structure assumes a position such that the valves are positioned for equalized pressures as long as no other forces are applied to the equalizer. However, as the equalizer has pressure areas, outer interior ends of the Sylphon bellows 114 and 214, exposed to the pressure spaces 126 and 226, a differential relationship of pressures, brought about in the latter spaces because of operation of the valves 131 and 231 by the inertia means, is responsible for a differential relation of forces applied to the equalizer such that the latter is adjusted to vary the pressures in the pipes 45 and 55 accordingly. That is, the inertia means acts to apply a differential of forces to the valves 131 and 231 which is accompanied by a like differential of pressures in the spaces 126 and 226 resulting in proportionate differential relationship of liquid pressures in the pipes 45 and 55.

The inertia controlled mass 135 is associated with springs and damper bellows in order to control the pilot valves in approximate proportion to the absolute velocity of the unbalance motion to be compensated. These auxiliary means are described in the following.

The mass 135 is supported against gravity by a coiled compression spring 241. A second spring 141 of lighter design, i. e. higher flexibility, serves to adjust the balancing effect by means of a set screw 142 whose adjusting nut 143 is accessible from the outside on top of the valve housing formed by body 105 (Figs. 6 and 11). The rather large mass 135 develops forces proportional to the absolute acceleration of the vehicle sprung mass to which the control device is attached. These forces, instead of being applied in their entirety to the pilot valves 131 and 231, are resisted predominantly by two damper bellows 151 and 251 whose interior is hydraulically connected with a system of orifices which will be described later. The function of these damping means is such that the mass 135 moves vertically with a small relative velocity proportional to its inertia force, which, in turn, is proportional to the vertical acceleration of the vehicle body. Since the vertical velocity of mass 135 is proportional to the acceleration of the body, the relative distance of motion of the mass is proportional to the vertical velocity of the body. In other words, the small displacements of the control mass are proportional to the absolute vertical velocity of the vehicle sprung mass.

This proportionality is predicated upon the whole force of the mass 135 being resisted by the control bellows damping. Actually, a small part of the inertia force is consumed in deflecting the balancing springs 141 and 241 and also in deflecting the spring stiffness of the damper bellows 151 and 251, and, of course, a little force is required to operate the poppet valves 131 and 231 against their difference in pressure. In the illustrated design, these deviations from the ideal are so slight that the movements of the control mass 135 are very closely proportional to the absolute velocity of the vehicle body over a broad range of frequencies within which a satisfactory stabilizing performance is expected.

The pilot valves 131 and 231 together with their respective orifices 127 and 227 are so proportioned that the difference between the respective pressures acting within the actuating bellows 114 and 214 of the main poppet valves 111 and 211 is approximately proportional to the movement of mass 135. Since the multiplier valve arrangement previously described produces pressure differences between compression and rebound proportional to the difference of the pressures within bellows 114 and 214, the net shock-absorber force produced in the shock absorbers proper is substantially proportional to the absolute velocity of the sprung mass.

The hydraulic system associated with the damper bellows 151 and 251 is so designed that the damping force is proportional to the velocity of the bellows motion independent of the viscosity of the incompressible operating fluid. In order to obtain this result, the following means are employed. The damper bellows 151 and 251 are mounted on the body 104 by means of fastening screws 152 and 252 respectively, which are provided with ducts 153 and 253 connecting the interior of the bellows with a bore 154 and 254, respectively of the body 104. Each of these ducts opens into a cavity 155 or 255 (Figs. 6 and 11). The body 101 has restricted thin-wall orifices at 156 and 256 which form a communication between the cavities 155 and 255 and the intermediate pressure chambers 113 and 213, respectively. Two similar thin-wall orifices 157 and 257 are provided in body 104 so as to connect the low pressure chamber within body 105 with the respective cavities 155 and 255. Due to these hydraulic connections, a constant flow of fluid is maintained from the intermediate pressure chamber 113 through the orifice 156, the cavity 155, and the orifice 157 to the low pressure space 128 (Fig. 6) and thence back through duct 129 (Fig. 7) to the neutral connections of the system. The duct 154 leading to the interior of the bellows 151 opens into this fluid passage at a point between the two orifices 156 and 157.

Similarly, a second fluid path is formed between the intermediate pressure chamber 213 through orifice 256, cavity 255, and orifice 257 to the low pressure chamber 128 with the interior of the bellows 251 connected by duct 254 with the space between the two orifices 256 and 257.

The hydraulic branch system thus formed for each damper bellows is represented by the straight line diagram of Fig. 4. The flow of oil passes from the intermediate pressure space 213 in the direction of the arrow P through the orifice 256 and the orifice 257 to enter the low pressure area 128. The pressure in space 255 between the two orifices 256 and 257 is applied to the interior of bellows 251. When the bellows 251 is compressed by a downward motion of the mass 135, part of the fluid is expelled from the bellows through the duct 254 into the intermediate space 255, as is indicated by the arrow Q. This expelled flow acts in the direction of arrow R on the flow coming from the orifice 256 and in the opposite direction, as shown by the arrow S, on the flow passing to the orifice 257. Hence, the flow through orifice 256 is diminished while the flow through orifice 257 increases. Although the law for each orifice is that the pressure is proportional to the square of the oil velocity through it, the fact that one flow diminishes and the other increases for a given bellows movement results in a push-pull action with the effect of obtaining an approximately linear law of pressure versus velocity of the bellows. This linear law is independent of changes in viscosity of the oil because the thin wall orifice characteristic is nearly independent of viscosity.

There is an average pressure in bellows 251 which could be used to balance the gravity of the control mass 135. It is desirable, however, to have the mass gravity balanced without the pump of the hydraulic system being in operation so that the customary passive shock-absorber action is obtained in the event of pump failure. For this reason, the second bellows 151 with its hydraulic system of orifices (Fig. 6) is used just to give a downward force due to the average pressure in bellows 151 in order to balance the average lift of bellows 251, and the spring 241 in conjunction with the adjusting spring 141 is provided for supporting the mass 135 under all conditions.

The vehicle wheels are relatively free to move up and down at all times. A certain small amount of damping is nevertheless desirable to prevent resonance of the wheel assembly. Such damping is provided by a proper choice of the average opening of the main valves 111 and 211. The presence of an average flow of oil from the pump through these two main valves, acting in push-pull operation, changes what would otherwise be a square law into an approximately linear law of force against unsprung mass velocity, which is desirable.

Although the above-mentioned damping for axle movements is relatively small, the forces developed in proportion to body velocity are great. This linear relation between shock-absorber force and absolute body velocity holds for all four quarter cycles of motion with resultant stabilizing transcending anything previously obtained.

As with all active regulated systems the presence of time delays is detrimental. The system here disclosed in combination with separate pump channels for rebound and compression is probably the quickest acting balancing or absorber system yet devised, being only a few thousandths of a second in its time from full on to full off. This rapidity is one of the essential factors of the improved riding qualities obtained by the system.

Some numerical values will be of interest in connection with the above described embodiment of the invention. The illustration of the shock absorber in Fig. 12 and of the control device in Figs. 6 through 11 are copies of true-to-scale drawings, the overall length of the assembled bodies 101 and 105 as shown in Fig. 7 being about 6⅝ inches and the overall width in the same showing being about 2⅝ inches. The other dimensions are in proportion to those just mentioned. A device of this size is applicable for passenger automobiles and can be operated to satisfaction when using a double outlet gear pump having about 2.5 gallons per minute per outlet at top car speed. The peak power requirement for the pump is between 1 and 2 horsepower when the vehicle is passing over rough roads with bumps having a height of 6 inches from crest to valley at the normally spring resonance. The resultant motion of the sprung body of the automobile instead of being accentuated is reduced to approximately plus and minus 1½ inches with reference to the original level of travel.

The significance of this balancing effect will be understood from the diagram of Fig. 13. The ordinate of this diagram represents the ratio of body motion to the motion of the unsprung mass of the vehicle. The abscissae represent the frequency of the unbalance motions in cycles per second. The curve $b$ exemplifies the behavior of a vehicle in which inactive shock absorbers of the customary (dashpot) type are employed. At the natural frequency of the sprung mass, the resonance motion of this mass is a multiple of the vertical motion of the unsprung mass. Curve $c$ exemplifies the behavior of the same shock absorber when it is adjusted to provide increased damping. As a result, the resonance motion of the sprung mass is reduced, though still a multiple of the vertical motion of the unsprung mass. It should be noted that while the use of increased damping in a passive shock absorber improves the riding comfort at resonance, a detrimental effect must be put up with at higher shock frequencies. Hence, the use of such absorbers involves always a compromise, and the feasible damping effect at resonance is always limited by the discomfort entailed at other frequencies.

In contrast thereto, curve $d$ represents the behavior of an active shock absorber operating with incompressible fluid and governed by inertia control in accordance with the invention. As indicated, the effect of resonance can be fully suppressed and the riding comfort improved also at higher frequencies.

This improvement is due to the fact that the shock absorbers proper in a system according to the invention do not merely act as damping means but in certain phases of operation act also as driving means, the oil active in the absorber devices being forced into the absorber chambers under a control determined by the absolute vertical motion of the vehicle sprung mass. The known passive shock absorbers provide hydraulic pressure in a given chamber only when the chamber volume is decreasing. The system according to the invention, however, provides hydraulic pressure in certain phases of operation even when the volume of the absorber chamber is increasing. The general law of control embodied by the system is that pressures are developed in proportion to the absolute vertical velocity of the sprung mass and in a direction opposite to such velocity even though fluid must be forced into an expanding chamber to accomplish this result. This response of the shock absorber operation to the primary governing effect is extremely fast because the governing impulse is transmitted by incompressible fluid and acts on a system in which a constant circulation of fluid is maintained during the entire period of travel.

In other words, when the vehicle passes over a road bump, the vertical motion is immediately sensed by the inertia controlled governing device and the shock absorbers are caused to perform an action tending to pull the wheels upward against the car body, thus virtually lifting them over the bump. After the wheels have passed over the peak of the bump, the pressure in the expanding absorber chambers is increased thus creating the tendency to push the wheels downward away from the car body.

The peak requirements for the supply of oil vary with the frequency of the unbalance movement to be compensated and hence with the travelling speed of the vehicle. Due to the fact, however, that in the above described embodiment the pumps are driven by the vehicle engine, the delivery of fluid is automatically increased at increasing engine and travelling speeds.

An aggregate of two double gear pumps applicable in a stabilizing system of the above-described type and in accordance with the schematic representation of pumps 46 and 46' in Fig. 5 is illustrated in detail in Figs. 14 through 19.

The pump illustrated in these figures contains a base 301 which is provided with a lateral projection 302 (Figs. 14 and 15) for fastening the pump to a suitable support, for instance, the body of the vehicle. Four substantially circular plates 303, 304, 305 and 306 are placed, one on top of the other, on the base 301 and covered by a top plate 307. These plates are fastened together and to the base plate by screws 308. The composite structure thus formed is enclosed by a casing 309 whose interior space 310 forms the sump or oil storage container of the unit. A screen 311 is mounted on the top plate 307 and fastened thereto by means of a ring 312 (Figs. 14, 16 and 17). As will be pointed out hereinafter, the oil collected in space 310 has to pass through the screen 311 before reaching the inlet ducts of the pump so that impurities will be retained by the screen.

The base 301 as well as the plates 303 through 307 are provided with a number of holes and cavities for receiving the elements of the pump mechanism and also for forming the necessary hydraulic ducts. The design and arrangement of these holes and cavities will become apparent from the following.

A main shaft 315 traverses the base 301 as well as each of the plates 303 through 307 and carries a drive wheel 316. This wheel is connected by a belt drive with the main shaft of the propulsion motor so that the pump shaft 315 revolves in accordance with the motor speed. Two other shafts 317 and 318 are arranged in parallel to the main shaft at diametrically opposite sides thereof (Figs. 14 and 18). The plates 303 and 305 have cavities for the reception of two respective sets of gears which form the impeller elements of the two double acting pumping devices combined in the illustrated unit. The shape and location of the cavities in plate 303 are apparent from Fig. 18. The corresponding cavities in plate 305 are of similar design and arrangement. Referring to the double-gear pumping mechanism arranged in plate 305, a central gear 319 is keyed to the main shaft 315, while two gears 320 and 321 are mounted on shafts 317 and 318, respectively, and in engagement with gear 319 (Figs. 14 and 18).

Similarly, a central gear 322 is keyed to the main shaft 315 within the central opening of plate 303 (Fig. 14) and meshes with two gears 323 and 324 mounted on shafts 317 and 318, respectively.

The plates 304 separate the two pumping devices from each other and the base 301, and plate 306 provide a tight cover of these devices so that they are sealed from the outside with the exception of the inlet and outlet connections to be described presently.

The base portion 301 of the multiple pump is provided with openings which are connected to conduits marked 45, 45', 55, 55', and 60 in Fig. 15. Conduit 45 is also shown in Fig. 17, conduit 55 in Fig. 16, and conduit 60 in Fig. 19. These conduits correspond to the equally designated conduits in Fig. 5, and Figs. 7 through 10 and 12 with the exception that conduits 60 and 60' of Fig. 5 are replaced in the embodiment of Figs. 15 through 19 by the single neutral conduit 60 which is branched into two portions corresponding to conduits 60 and 60' of Fig. 5 at a place not apparent from the illustrations of Figs. 15 through 19. In accordance with Fig. 5, the conduit 45 and 45' are the compression conduits of the front shock absorbers and rear shock absorbers, respectively, while conduits 55 and 55' in Figs. 15 through 18 are the rebound conduits of the front shock absorbers and rear shock absorbers, respectively.

The neutral or low-pressure conduit 60 according to Figs. 15 and 19 opens into a bore 360 which is connected through an opening 361 with the interior space or sump 310 within casing 309. The main shaft 315 extends through a packing gland 362 (Fig. 14) which is fastened to the base portion 301 by means of a pressure plate 363 so that an interstice 364 remains which forms a communication between the inner side of the packing gland and the lower bearings of the shafts 317 and 318. The bore 360 (Fig. 19) is connected with the interstice 364 through an opening 365. This relieves the pressure acting on the packing gland and permits a return flow of oil from the shaft bearings into the sump and neutral side of the system.

The sump 310 is connected through the screen 311 with the inlet sides of the two above-described pumping units by means of the following bores and ducts.

A bore 366 extends from underneath the screen 311 through all plates 307, 306, 305, 304 and 303 in parallel to the main shaft 315 (Figs. 15 and 17). Two radial cavities 367 and 368 in plates 306 and 304, respectively, connect the bore 366 with the compression inlet of the upper pump gears, as is also apparent from Fig. 18. Similar cavities 369 and 370 provided in the plate 304 and in the base portion 301 connect the inlet bore 366 with the compression inlet of the lower pump gears (Fig. 17).

A second bore 371 extends from the screen-covered top side of plate 307 through all plates 306, 305, 304, and 303 and is connected with the rebound inlet of the upper pump gear by ducts 372 and 373 and with the rebound inlet of the lower gear by ducts 374 and 375 (Fig. 16).

Turning now to the compression connections of the apparatus, a hydraulic path can be traced from compression conduit 45 in Figs. 15 and 17 through a duct 340, an axial bore 341, and two channels 342 and 343 of plates 304 and 306, respectively, to one of the outlet sides (compression outlet) of the upper pump gears. Consequently, part of the oil taken in from the sump through ducts 366, 367 and 368 is forced by the upper gear pump to the compression outlets 342 and 343 whence it reaches the compression conduit 45.

Similarly, a hydraulic connection can be traced from the second compression conduit 45' in Figs. 15 and 17 through a duct 344 and an axially extending bore 345 through channels 346 and 347 to the compression outlet of the lower pump unit. Hence part of the oil taken in by the lower unit through ducts 369 and 370 (Fig. 17) is forced through the compression outlet ducts 346 and 347 into the compression conduit 45'.

The rebound conduit 55 is connected through a duct 350 in base portion 301 (Figs. 15 and 16) with an axial bore 351 extending through plates 303, 304 and 305. Two channels 352 and 353 connect the rebound duct 351 with the rebound outlet of the upper pump gears. Consequently, part of the oil taken in by the upper pump device through ducts 371, 372 and 373 is forced into channels 352 and 353 whence it reaches the rebound conduit 55.

Similarly, a connection is established between the rebound conduit 55' (Fig. 15) through a duct 354, an axial bore 355, and two channels 356 and 357 (Fig. 16) with the rebound outlet of the lower pump. Hence, oil is forced from the intake bore 371 through the lower pump into the rebound conduit 55'.

Due to the above-described construction of the pump, the oil supplied to the pump through the neutral conduit 60 (and 60') and reaching the sump 310 is forced by hydraulically independent pumping means into the compression and rebound conduit of the front shock absorber system and simultaneously into the compression and rebound conduits of the rear absorber system in accordance with the scheme of Fig. 5 and in compliance with the requirements of the governing device described in the foregoing in conjunction with Figs. 6 through 12. While thus the pumping device combines virtually four separately operating pumping means, its overall dimensions are extremely small so that the device is especially suitable for application on automobiles and other vehicles.

While the foregoing description refers particularly to a stabilizing or shock absorbing system for four wheel vehicles, a similar system can be applied to buses, rail vehicles, or, in general, to any conveyance which contains control means for compensating unbalancing motions. The control devices to be used are to be dimensioned in accordance with the particular purpose. For instance, in rail cars, the system can be used for controlling lateral horizontal motions of the car body transverse to the direction of travel. For such an application a control device similar to the one shown in Figs. 6 through 12 but of correspondingly larger dimensions may be used in a position where the pivot 133 of the mass 135 extends vertically so that the inertia control reacts on horizontal deflections of the car body. In the latter application of the system, the balancing springs 141 and 241 may be omitted. Another use to which a system of this type may be put is the flight stabilization of aircraft. For this purpose, the cylinder and piston device for producing the stabilizing motion is applied to the ailerons or other stabilizing devices.

It will be obvious to those skilled in the art upon study of this disclosure that devices according to the above-explained principles can be designed which are different from the illustrated and described embodiments without departing from the gist of my invention. In view of this fact, I wish this specification to be understood as illustrative rather than in a limiting sense.

I claim as my invention:

1. A stabilizing apparatus for conveyances having a sprung mass carried by another mass, comprising relatively movable members disposed for connection to said respective masses, and defining together a pair of chambers of variable volume which function in response to the differential of liquid pressures supplied thereto to produce relative movement of said members in opposite directions; impeller means having an inlet and two outlets for issuing two respective currents of liquid under pressure; two conduits connecting said outlets with said respective chambers to supply liquid thereto; a by-pass connection between said two conduits having an opening in communication with said inlet; two valves arranged in said by-pass connection between said opening and said conduits respectively and being connected with each other for opposing action so as to reduce the pressure in either chamber when increasing the pressure in the other chamber; hydraulic means disposed for actuating said two valves and being in communication with said impeller means so as to be supplied with liquid under pressure, pilot valve means forming part of said hydraulic means for controlling said pressure and inertia means for controlling said pilot valve means in response to unstabilizing motion of the sprung mass so as to cause said members to perform relative motion in the direction required for compensating such motion.

2. In apparatus including sprung and unsprung masses, a pair of members connected to the masses and defining a pair of chambers of variable volume and which function in response to the differential of liquid pressures supplied thereto to produce relative movements of the members and of the masses connected thereto in opposite directions; a pair of positive displacement pumps; a pair of conduits communicating with the respective chambers and supplied with liquid by the respective pumps; each of said conduits having a by-pass opening provided with a valve seat at its discharge end; valves for the respective seats and each valve being movable toward its seat against the force of pressure of liquid in the associated conduit; movable means for mechanically interconnecting the valves so that, as one valve moves toward its seat, the other valve moves away from its seat and said means having the liquid pressure forces acting on the valves in opening directions applied thereto in opposed relation; and inertia means carried by and movable relatively to the sprung mass for operating said movable means to apply to the valves in closing directions of the latter forces which vary in inverse relation.

3. In a vehicle having a sprung mass mounted on an unsprung mass, shock-reducing means comprising a pair of members connected to the masses and defining a pair of chambers of variable volume and which function in response to the differential of liquid pressures supplied thereto to produce relative movements of the members and of the masses connected thereto in opposite directions; positive displacement pump means; a pair of conduits communicating with the respective chambers and supplied with liquid by said pump means; each of said conduits having a by-pass opening provided with a valve seat at its discharge end; valves for the respective seats and each valve being movable toward its seat against the force of liquid in the associated conduit; movable means for mechanically interconnecting the valves so that, as one valve is moved toward its seat, the other valve moves away from its seat and said means having the liquid pressure forces acting on the valves in opening directions applied thereto in opposed relation; and inertia means carried by the sprung mass and movable relatively to the latter in a direction transverse to that of vehicle travel, to move said movable means in order to change inversely forces applied to the valves and acting thereon in closing directions.

4. In a vehicle having unsprung mass, sprung mass, and shock absorbing means connected between said two masses, said means comprising in combination two relatively movable members forming together a pressure chamber of variable volume, a source of hydraulic pressure, conduit means forming a permanently open communication between said source and said chamber and having an escape opening, valve means for controlling said opening so as to govern the pressure in said chamber, hydraulic actuating means including a pilot valve for controlling said valve means so as to obtain relatively great valve action at said valve means by a relatively small valve action of said pilot valve, and inertia-controlled means for operating said pilot valve upon occurrence of shock in order to vary the pressure in said chambers for causing said elements to perform shock-compensating motion.

5. With a vehicle including a first body movably mounted on a second body, the combination of means for stabilizing said first body comprising a pair of members connected to the respective bodies and forming together a pressure chamber effective in response to liquid pressure supplied thereto to move the members and the bodies connected thereto relatively to stabilize the first body; a positive displacement pump; a conduit communicating with the chamber, receiving liquid discharging from the pump, and provided with an escape duct; a throttle valve for controlling the discharge of liquid from said duct, means defining a low pressure space and a medium pressure space with said medium pressure space arranged to receive liquid discharging from said duct and with said low pressure space having an escape opening; a loaded relief valve controlling the discharge of liquid from said medium pressure space in order to maintain substantially a constant pressure in the latter; a connecting duct for supplying liquid from said medium pressure space to said low pressure space; an inertia member carried by the first body; a valve controlled by the inertia member and cooperating with said connecting duct to vary the pressure therein; and means responsive to pressure in said connecting duct for controlling said throttle valve.

6. A stabilizing hydraulic apparatus comprising, in combination, a device for producing stabilizing motion having a pressure chamber of variable volume, a source of hydraulic pressure, conduit means connecting said source with said chamber and having an escape opening, valve means for controlling said opening so as to govern the pressure in said chamber, hydraulic means including an intermediate pressure space communicating with said conduit means through said opening so as to be connected with the low pressure side of said valve means, said space having a restricted outlet opening in order to assume pressure due to the flow of fluid therethrough, an inertia-controlled device for actuating said valve means including a supporting structure and a mass movably mounted on said structure for inertia-controlled motion relative to said structure, a damping container of variable volume disposed between said structure and said mass for varying its volume in dependence upon occurrence of said relative motion, a fluid conduit connected with said space so as to be traversed by fluid flow from said space and having a branch connected to said container for providing it with fluid pressure, said conduit having two flow-restricting orifices spaced from each other in the direction of fluid flow and located at opposite sides of said branch respectively so that the fluid flow through one of said orifices is increased and the flow through the other decreased during a change in volume of said container.

7. A stabilizing apparatus for conveyances having a sprung mass carried by another mass, comprising relatively movable members disposed for connection to said respective masses and defining togther a pair of chambers of variable volume which function in response to the differential of liquid pressures supplied thereto to produce relative movement of said members in opposite directions; a hydraulic conduit system including impeller means and having two pressure conduits disposed to form permanently open communications between said impeller means and said two chambers respectively, a hydraulic bypass interconnecting said two conduits so as to by-pass said chamber, throttle valves disposed between each of said conduits and said bypass, a return conduit communicating with said by-pass at a point between said throttle valves for supplying liquid to said impeller means, hydraulic actuating means including two interconnected pilot valves for inversely controlling said throttle valves simultaneously so as to increase the pressure in one of said chambers while reducing it in the other, and inertia-controlled means for actuating said pilot valves in response to unstabilizing motion of the sprung mass.

8. A stabilizing hydraulic apparatus comprising in combination a device for producing stabilizing motion having a pressure chamber of variable volume, a source of hydraulic pressure, conduit means connecting said source with said chamber and having an escape opening, throttle valve means for controlling said opening and thereby the pressure in said chamber, hydraulic means including an intermediate pressure space communicating with said conduit means through said opening so as to be connected with the low pressure side of said valve means, said space having a restricted outlet duct designed to assume pressure of relatively low magnitude, actuating means connected with said valve means and hydraulically communicating with said duct for actuating said valve means in dependence upon said low pressure, a pilot valve for controlling said duct in order to vary said low pressure, and inertia-controlled means connected with said pilot valve for actuating it in response to the occurrence of unstabilizing motion.

9. A stabilizing apparatus for conveyances having two relatively movable structures, comprising a pair of members designed for connection to the respective structures and defining a pressure chamber of variable volume which functions in response to the pressure of fluid supplied thereto to produce relative movement of said members, a device for supplying fluid under pressure, conduit means connecting said supply device with said chamber and forming a permanently open communication between them, said conduit means having an escape duct disposed between said supply device and said chamber, main valve means disposed in said duct for varying the resistance to flow of fluid through said duct in order to thereby vary the pressure in said chamber, said main valve means having a normal position corresponding to an average value of said flow resistance and being movable in opposite directions from said normal position to increase and decrease respectively said resistance between finite values above and below said average value, hydraulic transmission means connected with said main valve means for actuating the latter, pilot valve means forming part of said hydraulic transmission means for controlling the latter, and inertia means for controlling said pilot valve means in response to a motion to be stabilized, whereby said main valve means are caused to control said members to perform relative movement to counteract such motion.

10. A governing device, for the control of hydraulic stabilizing equipment, comprising a housing having a low pressure space with an outlet duct for the discharge of liquid, an intermediate pressure chamber communicating with said low pressure space, and a high pressure space communicating with said chamber and having an inlet duct for the supply of liquid under pressure and a duct for applying controlled pressure to the equipment to be controlled; a throttle valve disposed between said high pressure space and said chamber for controlling the escape of liquid from said high pressure space to said chamber to thereby vary said controlled pressure, said valve having normally an average flow area and being movable in opposite directions to respectively increase and decrease said area; flow restricting means forming part of the communication between said chamber and said low pressure space for maintaining the pressure in said chamber at a value between those of the pressures in said respective spaces; inertia-responsive control means biased to normally maintain a given position and deflectable therefrom in opposite directions; and means controlled by said inertia-responsive control means for actuating said valve so as to vary said controlled pressure in dependence upon the deflection of said inertia-responsive means.

11. A governing device, for the control of hydraulic stabilizing equipment, comprising a housing having a low pressure space with an outlet duct for the discharge of liquid, an intermediate pressure chamber communicating with said low pressure space, and a high pressure space communicating with said chamber and having an inlet duct for the supply of liquid under pressure and a duct for applying controlled pressure to the equipment to be controlled; a throttle valve disposed between said high pressure space and said chamber for controlling the escape of liquid from said high pressure space to said chamber to thereby vary said controlled pressure, said valve having normally an average flow area and being movable in opposite directions to respectively increase and decrease said area; flow restricting means forming part of the communication between said chamber and said low pressure space for maintaining the pressure in said chamber at a value between those of the pressures in said respective spaces; a variable volume container disposed in said chamber and connected with said valve for actuating the latter, an escape duct forming a communication between said chamber and said low pressure space for maintaining a continuous discharge of liquid from said chamber to said space, said container having an interior space hydraulically associated with said escape duct to actuate said valve in response to pressure in said escape duct; inertia responsive control means movably mounted in said low pressure space and being biased to normally maintain a given position and deflectable in opposite direction from said position; and a pilot valve disposed at the discharge end of said escape duct and controlled by said inertia-responsive means to vary the pressure in said container in order to actuate said throttle valve in dependence upon deflection of said inertia-responsive means.

12. A governing device, for the control of hydraulic stabilizing equipment, comprising a housing having a low pressure space with an outlet for the discharge of liquid, an intermediate pressure chamber in flow restricting communication with said low pressure space so as to maintain a pressure above that in said low pressure space when liquid flows from said chamber through said space, and two high pressure spaces separately communicating with said chamber and having each an inlet duct for the supply of liquid under pressure and a control duct for applying liquid under controlled pressure to the equipment to be controlled; two throttle valves disposed between said chamber and said respective high pressure spaces for controlling the escape of liquid from said latter space to said chamber to thereby vary said controlled pressure respectively, each of said throttle valves having normally a given flow area and being movable in opposite directions to respectively increase and decrease said area; means disposed in said chamber and interconnecting said valves for causing them to operate in inverse relation so that one of said controlled pressures is increased when the other controlled pressure is decreased by said valves; and a variable-volume container disposed in said chamber for actuating said valves, an escape duct forming a communication between said chamber and said low pressure space for maintaining a continuous discharge of liquid from said chamber to said space, said container having an interior space hydraulically associated with said escape duct to actuate said valves in response to pressure in said escape duct; a throttling pilot valve disposed in said low pressure space at the discharge end of said escape duct and having a normally open and variable flow area for controlling said pressure in said escape duct; and an inertia device movably mounted in said low pressure space and having a normal position from which it is deflectable in opposite directions, said device being connected with said pilot valve for controlling it in accordance with inertia-responsive deflections of the device.

13. A governing device, for the control of hydraulic stabilizing equipment, comprising a housing having a low pressure space with an outlet for the discharge of liquid, an intermediate pressure chamber in flow restricting communication with said low pressure space so as to maintain a pressure above that in said low pressure space when liquid flows from said chamber through said space, and two high pressure spaces separately communicating with said chamber and having each an inlet duct from the supply of liquid under pressure and a control duct for applying liquid under controlled pressure to the equipment to be controlled; two throttle valves disposed between said chamber and said respective high pressure spaces for controlling the escape of liquid from said latter spaces to said chamber to thereby vary said controlled pressure respectively, each of said throttle valves having normally a given flow area and being movable in opposite directions to respectively increase and decrease said area; means disposed in said chamber and interconnecting said valves for causing them to operate in inverse relation so that one of said controlled pressures is increased when the other controlled pressure is decreased by said valves; two variable-volume containers disposed in said chamber and connected with said respective valves for actuating them; two escape ducts communicating with said respective containers and forming separate discharge paths from said chamber to said low pressure space, each of said ducts having two flow restricting orifices spaced from each other in the flow direction to develop between said orifices a pressure to be effective in the appertaining container; two throttling pilot valves for controlling the flow area of said orifices at the respective low pressure sides of said escape ducts, said pilot valves being interconnected for simultaneous and inverse operation so that one increases the appertaining flow area for reducing the pressure effective in the appertaining container when the other pilot valve decreases the appertaining flow area for increasing the pressure effective in the other container; and an inertia means movably mounted in said low pressure space and connected with said pilot valves for controlling them by inertia-responsive deflection.

14. A governing device, for the control of hydraulic stabilizing equipment, comprising a housing having a low pressure space with an outlet duct for the discharge of liquid, an intermediate pressure chamber communicating with said low pressure space, and a high pressure space communicating with said chamber and having an inlet duct for the supply of liquid under pressure and a duct for applying controlled pressure to the equipment to be controlled; a throttle valve disposed between said high pressure space and said chamber for controlling the escape of liquid from said high pressure space to said chamber to thereby vary said controlled pressure, said valve having normally an average flow area and being movable in opposite direction to respectively increase and decrease said area; flow restricting means forming part of the communication between said chamber and said low pressure space for maintaining the pressure in said chamber at a value between those of the pressures in said respective spaces; an inertia weight pivotally mounted in said low pressure space; spring means disposed in said low pressure spaced for biasing said weight toward a given position; means for moving said valve under control by said weight in response to and in accordance with the direction of deflection of said weight from said position; a variable-volume container disposed in said low pressure space and connected with said weight for damping deflecting movement of said weight so as to render such movements substantially proportional to the absolute velocity of said weight; an escape duct communicating with said container, forming a path for the discharge of liquid from said chamber to said low pressure space, and having flow restricting orifices spaced from each other in the flow direction of the liquid in order to produce damping pressure between said orifices and in said container when said container is caused to change its volume due to deflection of said weight from said position.

15. A stabilizing apparatus for conveyances having a body structure movable relative to another structure, comprising relatively movable members disposed for connection to said respective structures and defining together a pair of chambers of variable volume which function in response to the differential of liquid pressures supplied thereto to produce relative movement of said members in opposite directions; means for supplying liquid under pressure; a pair of conduits forming each a permanently open communication between said means and said respective chambers, each of said conduits having an escape duct branched off at a place between said means and the appertaining chamber; a pair of throttle valve means for varying the flow of liquid through said respective escape ducts in order to vary the pressures in said respective chambers; said pair of valve means being interconnected for simultaneous operation in opposed relation so that the pressure in either chamber is reduced when the pressure in the other chamber is increased; hydraulic means connected with said valve means for actuating the latter by variable pressure and communicating with said liquid supply means, said hydraulic means having pilot means for controlling said pressure; and inertia means for controlling said pilot means in response to unstabilizing motion of the body structure to cause relative movement of said members in the direction required to counteract such motion.

16. In apparatus including a first body movably connected with a second body, means for stabilizing said first body comprising a pair of members connected to the bodies and forming together a pair of pressure chambers of variable volume which function in response to the differential of liquid pressures supplied thereto to move the members and the bodies connected thereto relatively to stabilize the first body; pump means; two conduits communicating with said respective chambers and supplied with liquid by said pump means, each of said conduits having an escape duct at a place between the pump means and the respective chambers, two normally open throttle valves disposed in said respective escape ducts for controlling the liquid pressures in the respective conduits; mechanical means interconnecting said throttle valves so that opening forces applied to said valves by pressures of liquid in the respective conduits balance each other through said mechanical connecting means; hydraulic means providing a pair of controlling pressure spaces; means including orifices for supplying liquid to the respective spaces; pilot valves controlling the escape of liquid from said spaces; inertia means responsive to motion to be stabilized of the first body to move said pilot valves so that as one is moved in an opening direction the other is moved in a closing direction to provide for inversely changing liquid pressures in said respective spaces; and pressure-responsive means subject to pressures of said spaces for moving said connecting means to move said throttle valves so as to inversely vary the pressures in said respective conduits in proportion to the variation of pressures in said spaces.

17. In apparatus including a first body movably connected with a second body, means for stabilizing said first body comprising a pair of members connected to the respective bodies and forming together a pair of pressure chambers of variable volume which function in response to the differential of liquid pressures supplied thereto to move the members and the bodies connected thereto relatively to stabilize the first body; a pair of positive displacement pumps; conduits communicating with the respective chambers and supplied with liquid by the respective pumps; two escape ducts branching off from said respective conduits; two by-pass valves disposed in said escape ducts for controlling the liquid pressures in the respective conduits; mechanical means interconnecting said by-pass valves so as to balance opposing opening forces applied to said valves by pressures of liquid in the respective conduits, actuating means providing a pair of controlling pressure spaces; an intermediate pressure chamber receiving liquid discharging from the by-pass valves; a loaded relief valve controlling the discharge of liquid from the intermediate pressure chamber; two connecting ducts for supplying liquid from the intermediate pressure chamber to the respective controlling pressure spaces; two pilot valves controlling the escape of liquid from said controlling pressure spaces; inertia means responsive to motion of the first body to move said pilot valves so that as one is moved in an opening direction the other is moved in a closing direction to provide for inversely changing liquid pressures in said spaces; and means subject to pressures of said respective spaces for actuating said mechanical means to move the by-pass valves so as to vary the pressure in said conduits in proportion to the variation of pressures in said spaces.

18. In a vehicle having sprung and unsprung masses, a pair of members connected to the masses and defining a pair of pressure chambers of variable volume responsive to differential pressures of liquid supplied thereto to effect relative movements of the members and the masses connected thereto, a pair of positive displacement pumps, a pair of conduits communicating with the respective chambers and supplied with liquid by the respective pumps, by-pass means forming a normally open communication between said conduits and branching off from said conduits at respective points located between said chambers and said pumps respectively, adjustable throttle valves for controlling the flow of liquid from said respective conduits into said by-pass means, mechanical means interconnecting said valves so as to equalize the opening forces applied to said respective valves due to conduit pressures acting thereon, an inertia member carried by the sprung mass and movable relative to the latter substantially in a plane transverse to the direction of vehicle travel, means controlled by said inertia member for moving said mechanical connecting means in accordance with relative movement of said inertia member to move said by-pass valves in mutually inverse relation, and damper means acting on the inertia member so that movement thereof and the consequent actuation of said valves depend substantially upon velocity of the sprung mass in said plane.

19. In combination with a travelling body, an apparatus for stabilizing said body comprising a casing and a movable member forming together a pressure chamber for imparting to said member a stabilizing motion relative to said casing, a conduit system containing incompressible fluid and including fluid impelling means having a pressure conduit connected with said chamber and a return conduit communicating with said pressure conduit at a place between said chamber and said impeller means, a throttle valve interposed between said pressure conduit and said return conduit and being movable in opposite directions from a normally open position for varying the pressure in said chamber, and inertia-controlled actuating means including a mass resiliently mounted so as to be capable of motion relative to said body and substantially in a plane transverse to the direction of travel of said body, transmission means connecting said mass with said valve for actuating said valve in proportion to movement of said mass, and damping means connected with said mass for rendering the velocity of its relative motion approximately proportional to its absolute transverse acceleration.

20. An inertia-controlled governing device, comprising a support, an inertia member movable relative to said support, control means capable of displacement to effect inertia responsive control and connected with said member so that said displacement is substantially proportional to relative movement of said member, a damping container of variable volume disposed between said support and said mass so as to vary its volume in dependence upon said relative movement, a fluid conduit having a branch connected with said container for providing it with fluid under pressure, said conduit having flow-restricting orifices at opposite sides of said branch respectively so that the fluid flow through one orifice is increased and the flow through the other decreased when said container varies its volume.

21. In a vehicle having sprung and unsprung masses, a pair of members connected to the masses and defining a pair of pressure chambers of variable volume responsive to differential pressures of liquid supplied thereto to effect relative movements of the members and the masses connected thereto, a pair of positive displacement pumps, a pair of conduits communicating with the respective chambers and supplied with liquid by the respective pumps, by-pass valves for the respective conduits, a mechanical connection between said valves for equalizing opening forces applied to said respective valves due to pressures in said respective conduits, an inertia member carried by the sprung mass and movable relative to the latter substantially in a plane transverse to the direction of vehicle travel to move said connection and valves, springs opposing movements of the inertia member in opposite directions from a mean position, and damper means for opposing movements of the inertia member in opposite directions and including variable volume chambers and orifices providing for flow of liquid into and out of the chambers.

22. An inertia-controlled governing device comprising a supporting structure, a mass movably mounted on said support so as to be capable of inertia-controlled motion relative to said support, a damping container of variable volume disposed between said structure and said mass for varying its volume in dependence upon occurrence of said relative motion, hydraulic conduit means for supplying a flow of liquid having two flow-restricting orifices spaced from each other in the flow direction of the liquid, said container being hydraulically connected with said conduit means between said two orifices so that the flow of liquid through one of said orifices is increased and the flow through the other decreased during a change in volume of said container.

23. A device for controlling differential pressures in a hydraulic stabilizing system, comprising two main poppet valves in said hydraulic system arranged for inverse operation so that one increases pressure while the other reduces pressure and being connected with each other to operate simultaneously, two variable-volume containers connected with said respective main valves for actuating said main valves, two hydraulic pressure supply conduits communicating with said respective containers and having each a pressure relief duct, two auxiliary poppet valves arranged in said relief ducts for controlling the resistance to fluid flow of said respective ducts, said auxiliary valves being connected with each other for simultaneous and inverse operation, and inertia-controlled governing means connected with said auxiliary valves for actuating said auxiliary valves.

CLINTON R. HANNA.

(References on following page)

REFERENCES CITED

The following references are of record in the file of this patent:

UNITED STATES PATENTS

| Number | Name | Date |
|---|---|---|
| 1,656,093 | Baker | Jan. 10, 1928 |
| 1,861,821 | Schaum | June 7, 1932 |
| 1,937,367 | Vickers | Nov. 28, 1933 |
| 2,088,487 | Schoepf et al. | July 27, 1937 |
| 2,161,687 | Schoepf et al. | June 6, 1939 |
| 2,166,956 | Kollsman | July 25, 1939 |
| 2,182,272 | Armstrong | Dec. 5, 1939 |
| 2,211,650 | Dwight | Aug. 13, 1940 |
| 2,212,426 | Mitereff | Aug. 20, 1940 |
| 2,338,897 | Boulogne | Jan. 11, 1944 |

FOREIGN PATENTS

| Number | Country | Date |
|---|---|---|
| 346,493 | Great Britain | Apr. 16, 1931 |
| 432,382 | Great Britain | July 25, 1935 |
| 518,848 | Great Britain | Mar. 8, 1940 |